United States Patent

Heck et al.

[11] Patent Number: 5,670,185
[45] Date of Patent: Sep. 23, 1997

[54] DIE ASSEMBLY FOR EXTRUDING EDIBLE SUBSTANCES

[75] Inventors: Ernst Heck, Vufflens La Ville; Marcel Mueller, Yverdon; Adrian Weber, Baulmes, all of Switzerland

[73] Assignee: Nestec S.A., Vevey, Switzerland

[21] Appl. No.: 540,939

[22] Filed: Oct. 11, 1995

[51] Int. Cl.⁶ .......................... B29C 47/06; B29C 47/18
[52] U.S. Cl. .................... 425/133.1; 425/382.3; 425/463; 426/516
[58] Field of Search .................. 425/319, 381.2, 425/382.3, 131.1, 133.1, 463, 377, 378.1, DIG. 47; 426/500, 516

[56] References Cited

U.S. PATENT DOCUMENTS

| | | |
|---|---|---|
| 1,714,234 | 5/1929 | Ost . |
| 2,199,825 | 5/1940 | Kretchmer ........................ 425/319 |
| 3,122,788 | 3/1964 | Lieberman ..................... 425/381.2 |
| 3,622,353 | 11/1971 | Bradshaw ............................ 99/169 |
| 3,759,647 | 9/1973 | Schrenk et al. .................. 425/133.1 |
| 4,203,715 | 5/1980 | Raley et al. ..................... 425/133.1 |
| 4,288,463 | 9/1981 | Groff et al. ........................ 426/500 |
| 4,445,838 | 5/1984 | Groff et al. ........................ 425/319 |
| 4,913,645 | 4/1990 | Daouse et al. .................... 425/150 |
| 5,059,375 | 10/1991 | Lindsay .......................... 425/382.3 |
| 5,556,653 | 9/1996 | Binley ............................. 426/516 |

FOREIGN PATENT DOCUMENTS

| | | |
|---|---|---|
| 0044689A1 | 1/1982 | European Pat. Off. . |
| 847554 | 10/1939 | France . |
| 2855607A1 | 6/1980 | Germany . |
| 1076117 | 7/1967 | United Kingdom . |
| WO9303909 | 3/1993 | WIPO . |

OTHER PUBLICATIONS

Derwent Database Abstract, WPI Acc. No. 80—46428C/27 of Hessenbruch, German Patent Application Publication No. DE 28 55 607 (Jun. 1980).

*Primary Examiner*—Robert Davis
*Attorney, Agent, or Firm*—Vogt & O'Donnell, LLP

[57] ABSTRACT

An extrusion die assembly has a body member which rotatably houses a barrel member which provides a tubular passage. The body member has an inlet channel for passage of a plasticized, especially edible, substance to the barrel member tubular passage which extends from a junction with the body member to at least one outlet channel. A rotary seal is provided at a junction between the body member and barrel member.

21 Claims, 4 Drawing Sheets

DIE ASSEMBLY FOR EXTRUDING EDIBLE SUBSTANCES

BACKGROUND OF THE INVENTION

1. Field of the Invention

The present invention relates to extrusion die assemblies.

2. Description of Prior Art

In order to make twisted products in the field of pasta, for example, special static dies are commonly used in which a raw kneaded dough to be extruded, having a high viscosity, is forced under the effect of high pressure through feed-channels of complicated design employing differentiated flow rates and pressure zones.

Such static dies cannot be used to make twists of coextruded products, especially filled pasta, the twisting being braked by the filling. They do not lend themselves either to the manufacture of twisted products expanded by the cooking-extrusion of a moistened flour, for example.

European Patent Application Publication No. 0 044689 (UNILEVER PLC) describes a die which can be used to manufacture an ice-cream-based confectionery article composed of several strands twisted together, for example. The die comprises a rotatable barrel which contains a plurality of independent feed-channels for feeding ice cream which extend to outlet orifices, each having an asymmetric shape or position with respect to the axis of rotation of the barrel, and inlet orifices of the feed-channels are provided at various levels in an upstream end of the barrel and are in communication with fixed rings which encircle the barrel at these various levels. The construction of such a die is relatively complicated, and it is difficult to adapt the die to the extrusion of plasticized masses of high viscosity, at a high pressure, a high temperature and/or with a high speed of rotation.

PCT International Patent Application Publication No. WO 93/03909 (UNILEVER PLC) describes an extrusion die which can be used to co-extrude simultaneously at least two strands, each formed by a tube containing a filling, and to twist them together. This die comprises a barrel which is rotatable about a fixed body, the barrel comprising at least two sets of two coaxial feed-channels parallel to the axis of the die, the fixed body comprising a central chamber for the feed of an inner feed-channel of each of said sets and an annular chamber for the feed of an annular outer feed-channel which is separated from the inner feed-channel of each of said sets by a tube integral with the barrel, a single central or axial feed-channel possibly being provided in the barrel and being fed via a tube, integral with said body, arranged coaxially in said central chamber. Such a die, which has especially annular seals applied against rotating walls of relatively fragile components such as tubes, is also relatively complicated and also is difficult to adapt to the extrusion of plasticized masses of high viscosity, at a high pressure, a high temperature and/or with a high speed of rotation.

SUMMARY OF THE INVENTION

The object of the present invention is to provide an extrusion die assembly, which is preferably independent, able to be incorporated with or connected to an extruder or press, having a simple and robust construction suitable for the extrusion of plasticized masses of high viscosity, at a high pressure, at high temperature and/or with a high speed of rotation, and which can be used to prepare, especially, articles which are twisted and/or filled in their center with a filling, having one or more strands of the pasta-type or expanded cocktail snack-type, for example.

For this purpose, the extrusion die assembly according to the present invention comprises a fixed solid body member, a rotatable barrel member housed by the body member and a bearing means therebetween for facilitating rotation of the barrel, wherein the barrel member defines a tubular passage and extends from a junction, formed by the body member and a first barrel member end about a barrel member tubular passage opening, to a second barrel member end having a tubular passage enclosure portion having at least one outlet channel opening and wherein the body member confines the barrel member first end and also defines and confines at least one channel which communicates with the tubular passage for passage of a plasticized, especially edible, mass of material to the barrel member tubular passage for passage to the barrel member second end enclosure and through the at least one channel opening. Rotary sealing means is provided at the junction between the body member and barrel member to seal the junction interface between the members, and the present invention includes means for rotating the barrel member.

DESCRIPTION OF PREFERRED EMBODIMENTS

In accord with the present invention, the body member channel preferably communicates with the tubular passage of the barrel member via an antechamber provided in said body to provide an upstream extension of the tubular passage, which preferably have rotational symmetry, and the rotary sealing means, being annular when the tubular passage is round, is positioned at the junction between said barrel member and said body member and defines a position between tubular passage and said antechamber.

The present die thus designed can in fact be used to produce, in particular, twisted multi-strand expanded pasta or cocktail snacks, especially multi-strand twisted spaghetti, for example, despite the particularly harsh conditions under which it may be called upon to work as regards the viscosity and/or temperature of the mass to be extruded, the pressure transmitted by the extruder or press, and/or the speed of rotation of the barrel member, it being possible for these conditions to be illustrated by values which can range up to approximately 50000 mPa.s for the viscosity, up to approximately 200° C. for the temperature and up to approximately 200 bar for the pressure, for a flow rate corresponding to a maximum speed of extrusion of approximately 1 ms$^{-1}$ and a maximum speed of rotation of the barrel member of approximately 300 rpm, for example.

Preferably, said rotary sealing means comprises a flat sealing ring of generally rectangular cross-section and is positioned in a groove of generally corresponding cross-section, an upstream plane face of the groove being provided in the wall of the body member which defines the antechamber and a downstream plane face of the groove being provided in the wall of the barrel member which defines the tubular passage.

Preferably, said rotary sealing ring has a cylindrical outer surface and a concave inner surface, especially an inverse semi-toroidal one. In other words, it has a rectangular cross-section in which the short side facing the center is hollowed out, especially in the form of a semi-circle.

Also preferably, a cylindrical outer surface of the groove is formed by an annular stop rim integral with the wall of the barrel member and a cylindrical inner surface of the groove is formed by an annular protective rim integral with the wall of the body member, an annular slot being left between a downstream end of the protective ring and said downstream plane face of the groove. Said protective rim is intended to prevent friction of the ring on said plasticized material.

Still preferably, fixing tenons passing through the ring are provided, these being integral with the wall of the body member.

The rotary sealing means may be made of any elastic material having a particularly low coefficient of friction. Preferably, it is made of polytetrafluoroethylene reinforced throughout its bulk with a stainless steel powder.

Surprisingly, it has been found that rotary sealing means of the type described hereinabove make it possible to solve particularly effectively the problem exhibited by the sealing of the present die assembly, given the particularly harsh conditions under which it may be called upon to work, as regards the viscosity and/or temperature of the mass to be extruded, the pressure transmitted by the extruder or press and/or the speed of rotation of the barrel.

The bearing means comprises at least axial bearing means positioned between wall surfaces of the body member and barrel member. In addition, as described further in connection with the description of the drawing Figures, the barrel member may be configured to have a portion having an outer wall portion having a cross-section of larger dimension than a remainder portion of the barrel member to form a planar surface which circumscribes the barrel member and thereby forms a shoulder portion, and radial bearing means may be positioned between the barrel member shoulder portion planar surface and a complementary planar surface shoulder portion of the body member positioned adjacent thereto, and the die configurations may include radial bearing means in combination with axial bearing means.

Moreover, in one particular embodiment of the present die assembly, the body member further may comprise at least one conduit defined by a tubular wall portion which passes through the barrel member tubular passage to a barrel second end enclosure channel opening for providing another passage for delivering such as a filling material. This embodiment can be used to produce twisted articles filled with a filling, in particular an edible filling, especially a filling of ground meat, tomato sauce and/or cheese for savory articles, or almonds, hazelnuts, chocolate and/or jam for sweet articles, for example, which does not impose particularly harsh working conditions as regards the viscosity, pressure and/or temperature, it being possible for these conditions to be illustrated by values of a few hundreds of mPa.s for the viscosity, a few bar to a few tens of bar for the pressure and approximately 20°–60° C. for the temperature, for example.

In the described further conduit embodiment, the respective positions of the body member channel for introducing said plasticized mass of material and of the conduit for said filling may be chosen depending on convenience of use criteria, for example. If the present die assembly is intended to be mounted vertically on a cart, provision may be made for said channel to extend transversely in said body and emerge laterally in an antechamber, such as described hereinabove, and for said conduit to extend axially in said body through said antechamber and said barrel member tubular passage in the form of a coaxial tube integral with the body member, for example.

Depending on whether the die assembly of the present invention is intended for the production of unfilled twisted articles or twisted articles filled with a filling, provision may be made for said barrel member to comprise outlet channel openings and/or conduits arranged in various ways and having cross-sections of various shapes.

For the production of unfilled multi-strand twisted articles, said barrel member may comprise a portion providing an enclosure having a plurality of outlet channel openings arranged symmetrically with respect to its axis, especially three openings of circular cross-section, these being arranged at vertices of an equilateral triangle centered on the axis, for example.

For the production of single-strand twisted articles filled with a filling, said barrel member may comprise an axial outlet conduit for the filling, having a circular cross-section, and an outlet channel opening for the plasticized mass which surrounds said outlet conduit for the filling but having a cross-section whose shape is not purely annular.

However, in the case where an axial outlet conduit for the filling should have a cross-section which is not purely circular, but on the contrary a cross-section having angles or irregularities, such as a triangular cross-section for example, provision may be made for an outlet conduit for the filling delimited by a rotatable tube integral with said barrel member and connected to said body member conduit for the filling via a rotary seal.

In order to be able to be rotated by driving means, such as an electric motor, said barrel member may have a downstream second end part which extends out of said body member and may comprise a pinion integral with this downstream part, for example. Advantageously, provision may be made for said downstream part of the barrel member to include a removable second end insert which is easily accessible from the outside and in which are provided said at least one outlet channel opening for the plasticized mass and/or said at least one outlet conduit for the filling. A set of inserts thus may be provided which are easily interchangeable from the outside and which can be used to manufacture various products with various embodiments of the die assembly.

Finally, circuits suitable for circulating a coolant or a heating fluid may be provided in the body member and/or in the barrel member.

The present die assembly is therefore designed so that it may be independent and be incorporated into or connected to an extruder or a press. It is most particularly intended for the production of products, especially foodstuffs, by extrusion, cooking-extrusion or cooking-extrusion-expansion of a plasticizable mass of material through the effect of pressure and/or temperature and/or shear exerted on it in said extruder or said press.

The present die assembly also lends itself advantageously to construction of an extrusion installation, lying within the scope of the present invention, which comprises an extruder or press connected via a branch-off valve to at least one die assembly according to the present invention, means for driving the barrel member and means for guiding the extruded twisted product to a station for receiving said product. This or these die assemblies may be fixed onto one or more carts, this cart also being able to carry said means for driving the barrel of the die and said guiding means.

Said branch-off valve is an important part of the installation, intended to make it possible, especially, to connect up the die assembly only when a production process has been started correctly or to disconnect the die assembly without stopping the extruder or the press when it is desired to modify the configuration of the die assembly during the course of production, for example.

Said guiding means themselves represent the first contact of the extruded product with a surface not integral with the barrel member, by virtue of which contact the extruded product experiences the desired torsional movement by rotation of the barrel member.

The die assembly and the installation according to the present invention, as well as the products that they allow manufacture of, are described in more detail herein below with reference to the drawing Figures.

DETAILED DESCRIPTION OF THE DRAWINGS

Figure 1:
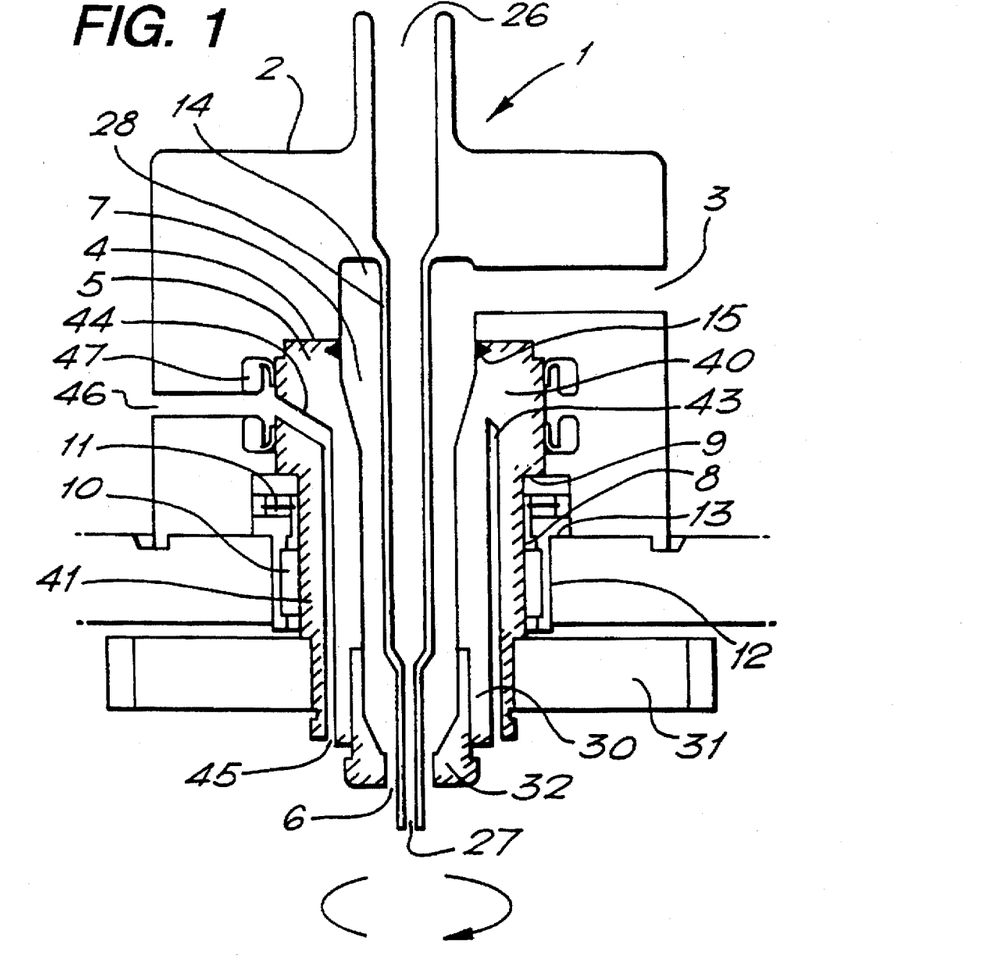
FIG. 1 illustrates a diagrammatic view in longitudinal section of an embodiment of the die assembly of the present invention.

In the embodiment illustrated in FIG. 1, the die assembly 1 comprises a fixed solid hollowed body member 2 which has an outer wall surface which defines its outer periphery and which has a wall portion which defines and confines an inlet channel 3 for introduction of a plasticized, especially edible, mass of material, and body member 2 has an inner wall surface 4 which houses, rotatably, a barrel member 5 which extends from a first end, which comprises a wall surface which circumscribes an opening into the barrel member tubular passage 7, to a second end which provides an enclosure having an outlet channel opening 6.

A first portion of the inner wall of surface body member 2 is positioned and configured to circumscribe the outer wall surface of barrel member 5, and a second portion of the inner wall surface of body member 2 extends transversely with respect to first body member inner wall surface to form a junction portion with a wall surface of the first end of barrel member 5. The hollowed interior of barrel member 5, defined by an inner wall surface, provides the tubular passage 7 which communicates upstream with the transversely extending body member inlet channel 3 and downstream with the outlet channel opening 6 in the second end enclosure portion. The outer surface portions 8, 9 of the barrel member 5 interact via axial and radial bearings 10, 11 with body member surface portions 12, 13 of the inner wall surface 4, the radial bearing being positioned between complementary shoulder portion surfaces 9 and 13.

In the embodiment of FIG. 1, the hollowed barrel member 5 comprises an upstream part 40 and a central part 41, both parts contained by the body member inner wall surface 4, and a downstream barrel member part 30 extends out of the body member 2. The upstream part 40 has a larger diameter and forms an annular plane cutback 9 with respect to the central part 41 of smaller diameter, this cutback 9 interacting via a radial bearing 11 with an annular plane shoulder 13 of body member inner wall 4. The central part 41 has a cylindrical outer surface 8 interacting via an axial bearing 10 with a cylindrical inner surface 12 of body member inner wall 4. A pinion 31 integral with the downstream part 30 is provided.

As also illustrated in FIG. 1, the inlet channel 3 communicates with the tubular passage 7 via antechamber 14 having rotational symmetry, which provides an upstream extension of the tubular passage 7. Rotary annular sealing means 15 is provided at the junction between the barrel member 5 and body member inner wall surface 4 thereby being at a position between the tubular passage 7 and the antechamber 14. Thus, in this embodiment, the body member 2 confines the end of the hollowed barrel member displaced away from its channel opening end and also confines the antechamber which communicates with the tubular passage 7 and body member inlet channel 3.

The body member 2 furthermore comprises a conduit for a filling, especially an edible one, which extends to an outlet conduit opening 27 for the filling, passing through the barrel 5. Thus, as illustrated, the body member 2 further comprises a wall portion which defines a part of the conduit which extends from an opening 26 in the body member outer surface to an integral tubular portion 28 which passes through antechamber 14 and the tubular passage 7 to the second end of the barrel member 5 which provides the enclosure which contains the channel opening 27 to thereby define a body member tubular passage for passing substance to opening 27. The conduit tubular portion, therefore, is coaxial with and has a cross-section dimension less than a cross-section dimension of the barrel member tubular passage 7.

As illustrated in FIG. 1, the conduit opening 27 for the filling is axial and has a circular cross-section. The outlet channel opening 6 for the plasticized mass surrounds the conduit opening 27 and has a cross-section of not purely annular shape. As illustrated, the second end downstream part 30 of the barrel member is a removable insert 32 which includes outlet channel opening 6 for the plasticized mass and has provision for accommodating tubular portion 28 which terminates in outlet opening 27 for the filling. Thus, the second end of barrel member 5 has at least two outlet channel openings for passage of substances through the die assembly of the invention.

A circuit for the circulation of a coolant or a heating fluid is provided in the barrel member 5, which comprises, for this purpose, a cylindrical recess 43 between its outer surface and the tubular passage 7, a fluid supply channel 44 leading to the recess 43 in its upstream part 40 and an annular fluid outlet opening 45 in its downstream part 30, said fluid supply channel 44 communicating with a fluid inlet channel 46 in the body member 2 via an annular conduit-seal 47 provided in the inner wall 4 of the housing body member 2.

Figure 6:
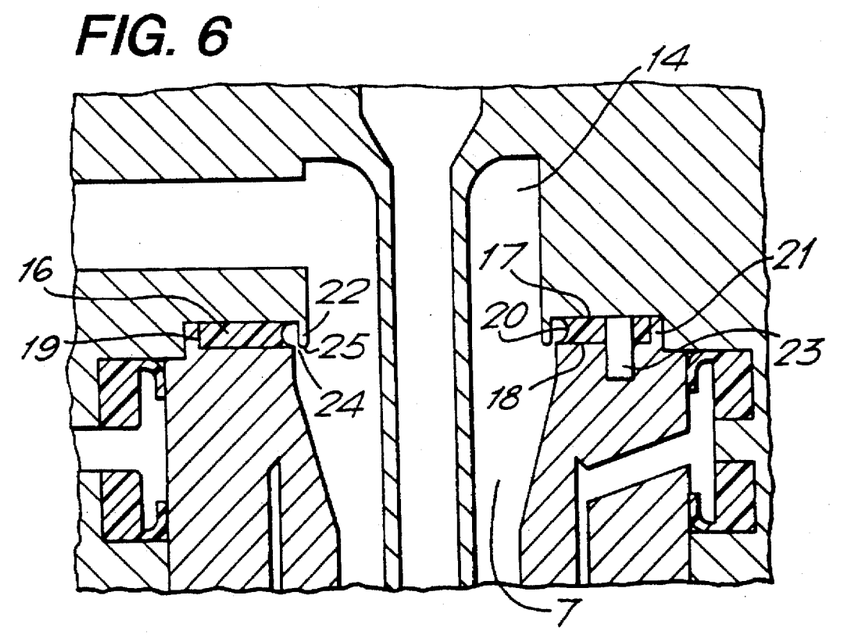
FIG. 6 represents an enlarged view in longitudinal section of the junction between the barrel member and the body member of the embodiment of the die assembly illustrated in FIG. 1.

As may be seen in FIG. 6, in the embodiment of the die assembly illustrated in FIG. 1, the rotary annular sealing means 15 comprises a flat sealing ring 16 of generally rectangular cross-section, provided in an annular groove of generally corresponding cross-section, an upstream plane face 17 of the groove is provided in the wall of the body member 2 and a downstream plane face 18 of the groove being provided in the wall of the barrel member 5.

The sealing ring 16 has a cylindrical outer surface 19 and a concave inner surface 20, in this case, an inverse semi-toroidal surface.

A cylindrical outer surface of the groove is formed by an annular stop rim 21 integral with the barrel member 5, and a cylindrical inner surface of the groove is formed by an annular protective rim 22 integral with the wall of the body member 2 abutting antechamber 14, an annular slot 24 being left between a downstream end 25 of this protective rim and said downstream plane face 18 of the groove.

Fixing tenons 23 passing through the sealing ring 16 are provided, these being integral with the barrel member 5. The sealing ring is made of polytetrafluoroethylene reinforced with a stainless steel powder, which confers on it both a low coefficient of friction, in this case, on a polished stainless steel surface, and a suitable wear resistance.

Figure 2:
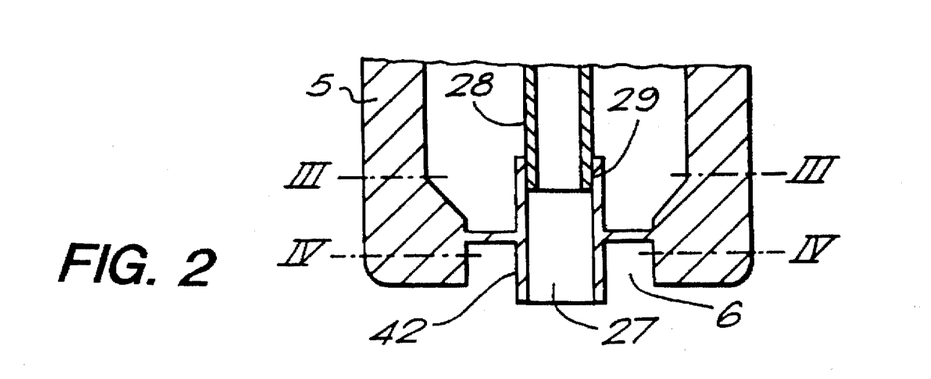
FIG. 2 illustrates a diagrammatic view in longitudinal section of a detail of the barrel member of another embodiment of the die assembly.
Figure 3:
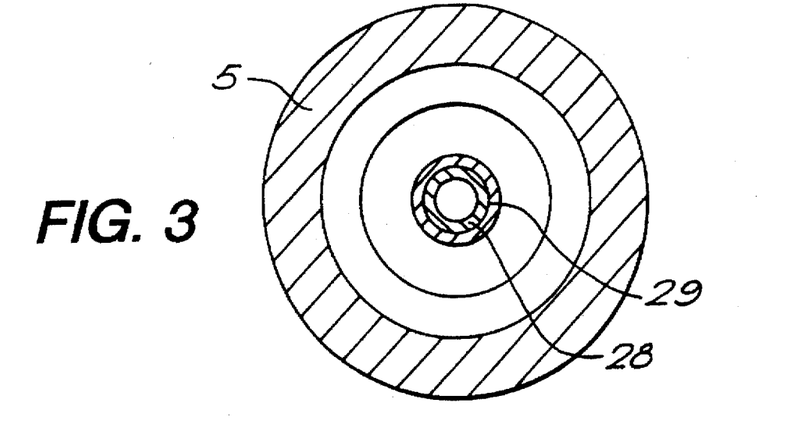
FIGS. 3 and 4 illustrate two transverse sections along the lines III—III and IV—IV of FIG. 2.
Figure 4:
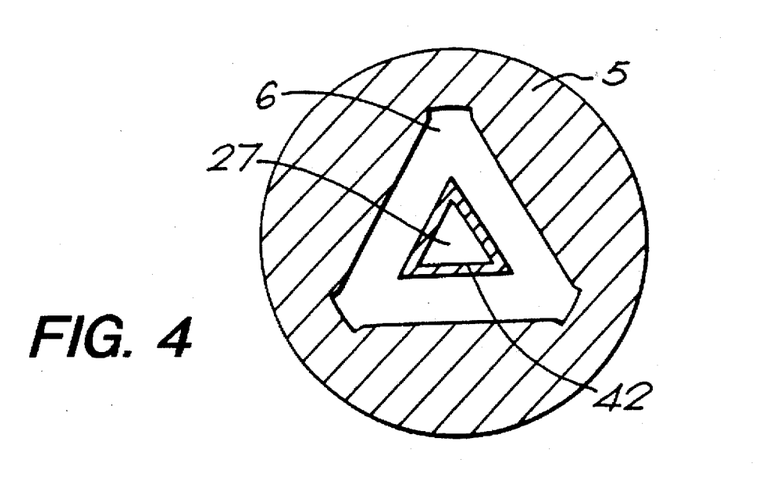

In a second embodiment, in which FIGS. 2, 3 and 4 show a detail of the barrel member 5 in a longitudinal section and two transverse sections, the parts other than the barrel member being similar to those of the embodiment shown in FIG. 1, a conduit outlet opening 27 is provided for the filling and is delimited by a central tube 42 integral with the barrel member 5 and connected to the coaxial tube 28 via a rotary seal 29. The conduit opening 27 for the filling and the outlet channel opening 6 for the plasticized mass have respective cross-sections which are not purely circular or annular, and are in this case, triangular cross-sections.

Figure 5:
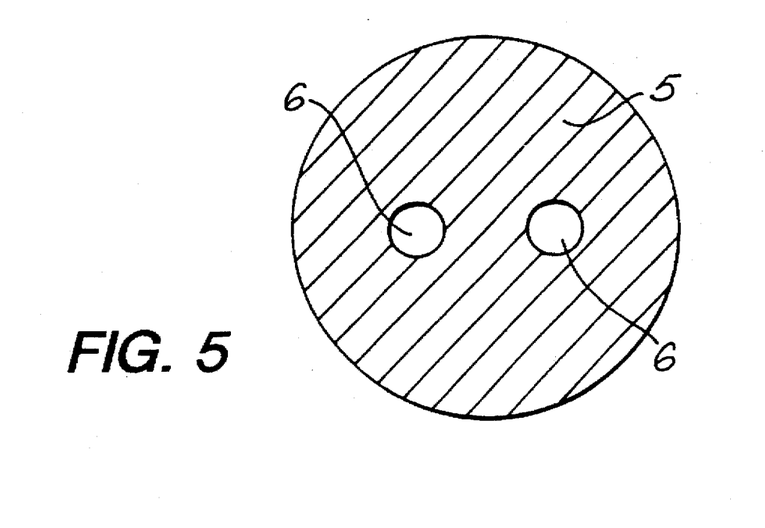
FIG. 5 illustrates a diagrammatic view in transverse section of the barrel member of a third embodiment of the die assembly of the present invention.

In a third embodiment, in which FIG. 5 shows a detail of the barrel member 5 in transverse section, the die assembly does not comprise tube 28 or tube 42, and the barrel member 5 comprises two outlet channel openings 6 for the plasticized mass which are parallel to and at an equal distance from the axis of the barrel member, each channel opening having a circular cross-section.

Figure 7:
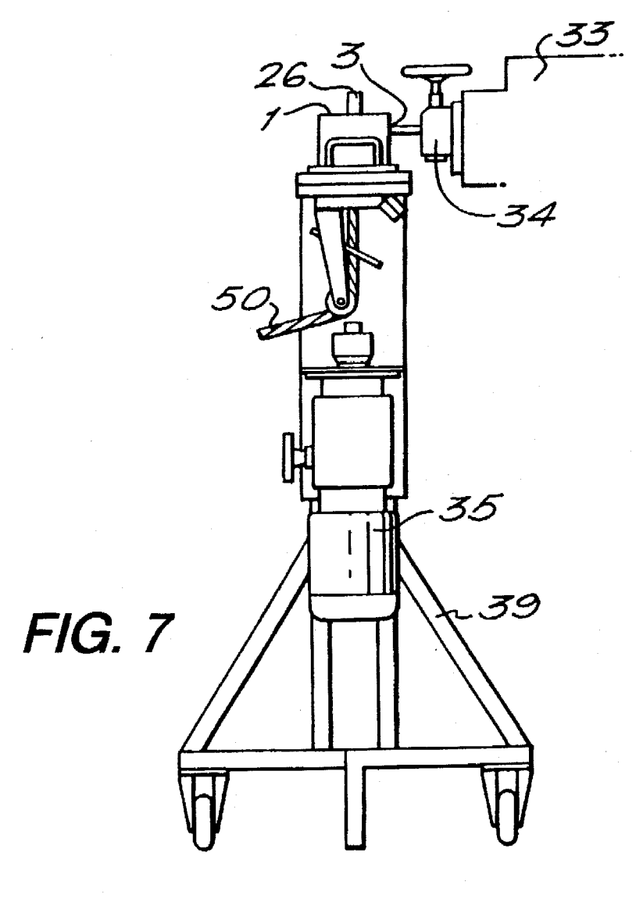
FIG. 7 illustrates a diagrammatic side view of an embodiment of an installation comprising two die assemblies.
Figure 8:
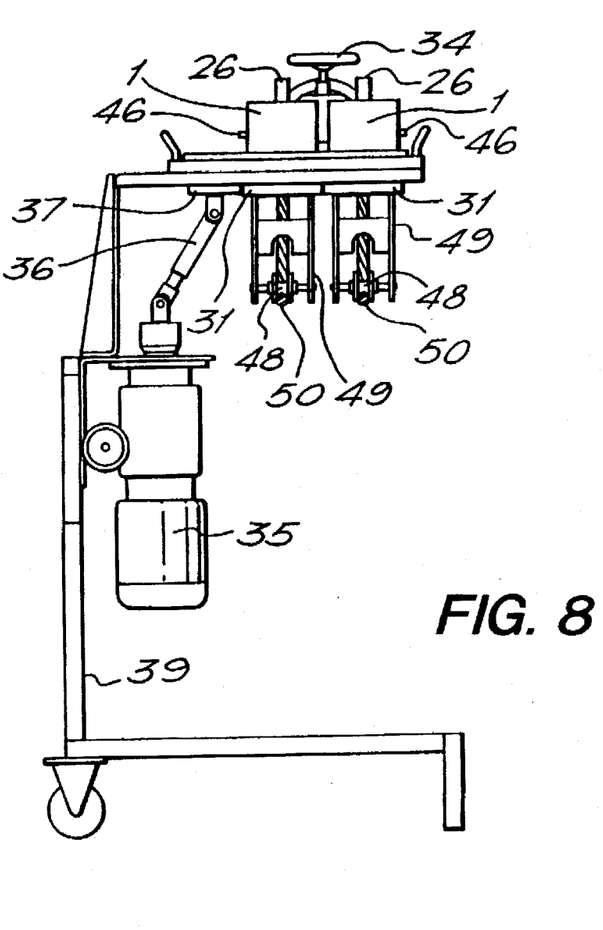
FIG. 8 illustrates a diagrammatic front view of the embodiment of the installation illustrated in FIG. 7.

As shown in FIGS. 7 and 8, an installation in accordance with the present invention comprises an extruder 33 connected via a branch-off valve 34 to two die assemblies 1, means 35, 36, 37 for driving the barrel member 5, means 48, 49 for guiding the extruded twisted product 50 to a station, not shown, for receiving this product and a cart 39 carrying the die assemblies 1, the driving means 35, 36, 37 and the guiding means 48, 49.

The driving means comprise a motor 35, a drive shaft 36 and a driving pinion 37 for transmitting rotational movement to the coupled pinions 31 of the barrel members 5.

The guiding means comprise pulleys 48 and their respective supports 49.

FIG. 9 shows lengths of three examples a), b) and c) of products that can be manufactured with the three embodiments of the die which are described, respectively, with reference to FIGS. 1, 2–4 and 5.

Figure 9A:
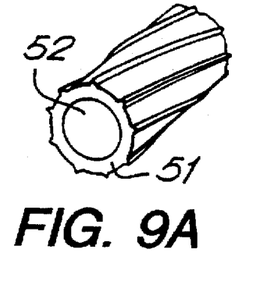
FIG. 9 illustrates examples of products that can be manufactured with the embodiments of the die which are illustrated, respectively, in FIGS. 1, 2–4 and 5.

In a), a length of a single-strand twisted product filled with a filling is illustrated. The outer part or casing 51 of this product has a cross-section of generally but not purely annular shape, in this case a cross-section having asperities on its perimeter which form a twisted pattern in relief on the product. The inner part or filling 52 of this product has a circular cross-section.

Figure 9B:
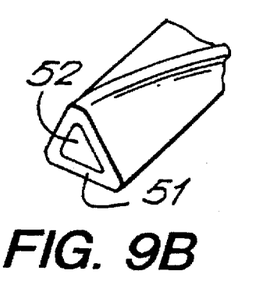

In b), a length of a single-strand twisted product filled with a filling is illustrated. The inner part 52 of this product has a cross-section which is not purely circular, in this case a triangular cross-section which corresponds to the triangular cross-section of the outer part 51 of the product.

Figure 9C:
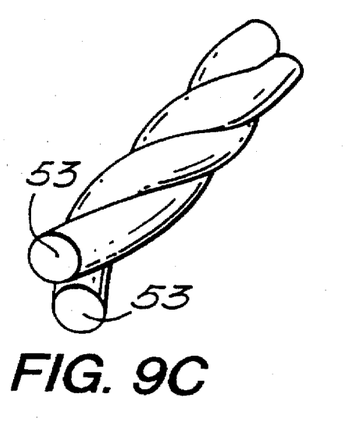

In c), a length of an unfilled multistrand twisted product formed by two strands 53 of circular cross-section is illustrated.

The example below is given by way of illustration of a production carried out using a die assembly of the present invention.

EXAMPLE

Using an extrusion installation comprising an extrusion die as described with reference to FIG. 1 and connected to a twin-screw extruder, a single-strand article filled with a filling is produced, as shown in FIG. 9a).

In order to produce the outer part, the extruder is fed with a mixture of 80% of maize-based semolina and 20% of water. The mixture is plasticized and cooked in the extruder at 140° C. at 120 bar at a speed of rotation of the screws of 260 rpm. The stream of plasticized mass, which has a viscosity of 20000 mPa.s, is extruded at a rate of exit from the die of 1 ms$^{-1}$.

In order to produce the inner part, a marmalade, having a temperature of 45° C. and a viscosity of 800 mPa.s, is injected into the die at a pressure of 16–25 bar.

A single-strand product made of expanded cereal filled with a jam filling, the cylindrical surface of which has a twisted relief pattern, is thus obtained.

As is clear from the foregoing, various modifications of the present invention may be made without departure from the spirit and scope of the disclosure, and the invention may be embodied and/or practiced suitably in the absence of and/or to the exclusion of elements or members and/or limitations not specifically disclosed herein.

We claim:

1. An assembly for extruding substances comprising:

a first hollowed assembly member comprising an outer wall surface and an inner wall surface, a first end surface which extends between the inner and outer wall surfaces and a second end which comprises wall surfaces which define at least one channel opening wherein the first end surface and inner wall surface circumscribe and define an opening and wherein the inner wall surface extends between the first end surface to the second end and defines a hollowed tubular passage for passing a substance from the member first end to the member second end for passage through the at least one channel opening;

rotary sealing means which is positioned on the first end surface about and coaxial with the opening and which comprises a concave inner surface which extends transversely from the first end surface;

a second hollowed assembly member comprising (i) an outer wall surface and an inner wall surface and (ii) a wall portion which defines a channel wherein the second member inner wall surface comprises (a) a first surface portion which extends coaxially with the first member outer wall surface and is configured and positioned to circumscribe the first member outer wall surface and (b) a second portion which comprises a surface and a rim which protrudes transversely from the second portion surface wherein the second portion surface extends transversely from the first surface portion towards the tubular passage so that the rotary sealing means is positioned between the second portion surface and the first member first end surface and wherein the second portion surface extends and the rim portrudes so that a slot is formed between the rim and the first member inner wall surface and (c) a third surface portion configured to confine an area about the first member first end opening and wherein the first and second portions are configured so that the first member is rotatable within the second member and wherein the wall portion which defines the channel extends from the second member outer surface to the second member inner surface third portion so that the channel communicates with the first member tubular passage for feeding a substance to the tubular passage for passage of the substance from the first member first end to the first member second end; and bearing means positioned between the first member outer surface and the second member inner surface for facilitating rotation of the first member.

2. An assembly according to claim 1 wherein the second member further comprises a further wall portion which defines an opening in the second member outer surface which extends to the opening in the third portion enclosure further comprises a tubular portion which is integral with and extends from the further wall portion, wherein the second member tubular portion has a cross-section dimension less than a cross-section dimension of the first member tubular passage and extends within the first member tubular passage from the first end to a second end channel opening to define a second member tubular passage for passing a substance therethrough and to the first member second end and wherein the first member second end comprises an opening which communicates with the second member tubular passage.

3. An assembly according to claim 2 wherein the first member second end has at least two channel openings therethrough for passage of a substance from the first member tubular passage and from the second member tubular passage therethrough.

4. An assembly according to claim 1 wherein the bearing means comprises axial bearing means positioned between the first member outer wall surface and the second member inner wall surface first portion.

5. An assembly according to claim 1 wherein the first member is configured so that a portion of the first member between the first and second ends has an outer wall cross-section of larger dimension than a remainder portion of the second member and terminates in a portion at a position displaced away from the first end to form a planar surface which circumscribes the first member.

6. An assembly according to claim 5 wherein the bearing means comprise radial bearing means positioned between the second member inner wall surface first portion and the planar surface.

7. An assembly according to claim 6 wherein the bearing means further comprise axial bearing means positioned between the second member inner wall surface first portion and the first member outer wall surface at a position between the radial bearing means and the first member second end.

8. An assembly according to claim 1 wherein the second member third portion surface is configured to provide an antechamber adjacent the first member tubular passage adjacent the first member first end.

9. An assembly according to claim 1 or 2 wherein the first member further comprises interior wall portions which define a channel between the first member inner and outer wall surfaces and which surround and extend coaxially with the first member tubular passage for at least a portion of an axial length of the first member tubular passage and so that the channel extends to the second end and wherein the first member second end comprises an opening which communicates with the channel.

10. An assembly according to claim 1 wherein the sealing means concave surface is an inverse semi-torodial surface.

11. An assembly according to claim 1 wherein the rotary sealing means comprises a second surface which opposes the concave surface and the first member first end further comprises a rim which protrudes from the first end at a position adjacent an edge of the sealing means second surface and which is co-axial with the sealing means second surface.

12. An assembly according to claim 1 or 10 further comprising tenons which extend from the second member first end for fixing the sealing means to the second member.

13. An assembly according to claim 2 further comprising a tubular member and rotary seal means integrated with the second member third wall to extend the second member tubular passage and means for affixing the tubular member to the first member so that the tubular member is rotatable with the first member.

14. An assembly according to claim 1 further comprising means for rotating the first member.

15. An assembly according to claim 14 wherein the rotation means comprises a pinion integral with a portion of the first member outer surface.

16. An assembly according to claim 1 wherein the first member second end is an insert die plate which is removable from the first member.

17. An assembly according to claim 1 further comprising an extruder and branch-off valve piping which connects the extruder to the second member wall portion which defines the channel in communication with the first member tubular passage for extruding a substance and delivering extruded substance to the channel and to the first member tubular passage.

18. An assembly according to claim 17 further comprising at least one cart for carrying the first and second assembly members and means for rotating the second member.

19. An extrusion die assembly comprising:

a hollowed body member and a hollowed barrel member and rotary sealing means wherein the body member rotatably houses the barrel member and houses the rotary sealing means and wherein the barrel member comprises a first end, a wall surface which defines a tubular passage and a second end tubular passage enclosure portion comprising at least one channel opening therethrough wherein the wall surface extends from a first end tubular passage opening to the second end tubular passage enclosure portion, the rotary sealing means is positioned between the barrel member first end and the body member at a position about the tubular passage opening and comprises a concave surface at a position which faces the opening, and the body member comprises a wall surface adjacent the rotary sealing means and a rim which extends from the body member wall surface towards the tubular passage so that a slot is formed between the rim and the barrel member tubular passage wall surface and comprises further wall surfaces which define and confine a channel and an area which communicate with the barrel member first end opening and tubular passage; and bearing means positioned between the body member and barrel member for facilitating rotation of the barrel member.

20. An assembly according to claim 19 wherein the body member further wall surfaces which define and confine the area about the first end opening define an antechamber which extends from the barrel member first end tubular passage opening.

21. An assembly according to claim 19 wherein the barrel member further comprises a portion having a cross-section of larger dimension than a remainder barrel member portion and a planar surface shoulder portion which circumscribes the barrel member between the larger cross-section portion and the remainder portion, and the body member further comprises a planar surface shoulder portion positioned adjacent the barrel member planar surface portion and wherein the assembly further comprises bearing means positioned between the body member and barrel member shoulder portions.

* * * * *

UNITED STATES PATENT AND TRADEMARK OFFICE
CERTIFICATE OF CORRECTION

PATENT NO. : 5,670,185
DATED : September 23, 1997
INVENTOR(S) : Ernst HECK, et al.

It is certified that error appears in the above-indentified patent and that said Letters Patent is hereby corrected as shown below:

Column 5, line 31, delete "9" and insert therefor -- 9(a) - 9(c) --.

Signed and Sealed this

Twenty-fifth Day of August, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,670,185
DATED : September 23, 1997
INVENTOR(S) : Ernst HECK, et al.

It is certified that error appears in the above-indentified patent and that said Letters Patent is hereby corrected as shown below:

Column 8, line 55, change "portrudes" to -- protrudes --.

Column 9, line 7, after "enclosure" insert -- and --.

Signed and Sealed this

Twenty-second Day of September, 1998

Attest:

BRUCE LEHMAN

*Attesting Officer*         *Commissioner of Patents and Trademarks*